June 10, 1969   R. B. FARMER   3,448,979
FEEDING AND TRANSPORTING MECHANISM FOR X-RAY
FILMS OR OTHER SHEETS
Filed May 10, 1967   Sheet _1_ of 3

INVENTOR
Robert B. Farmer
by McDougall, Hersh, Scott
and Ladd
Att'ys

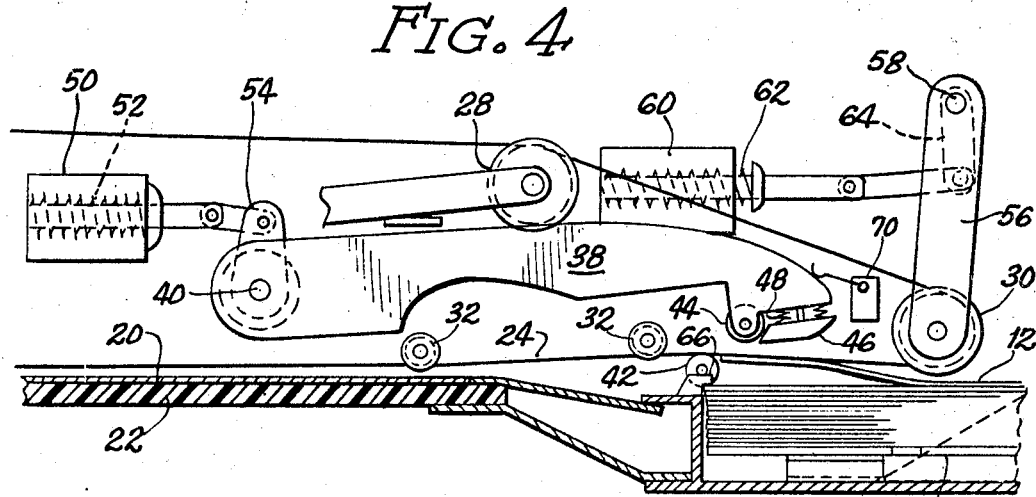
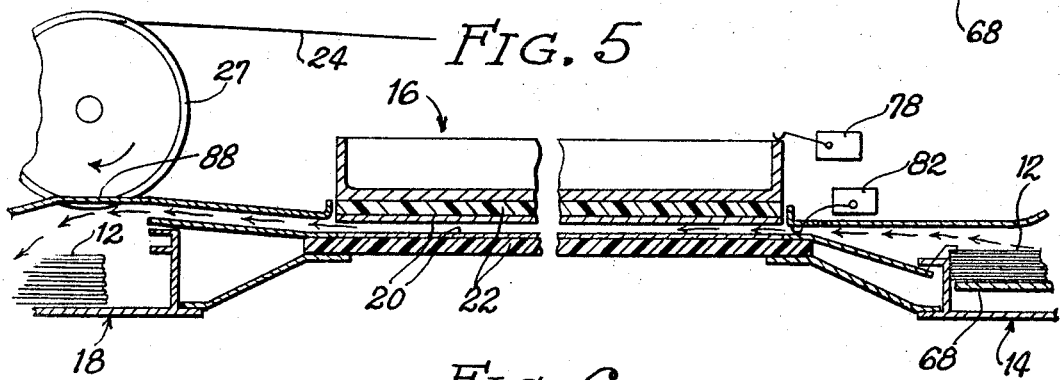
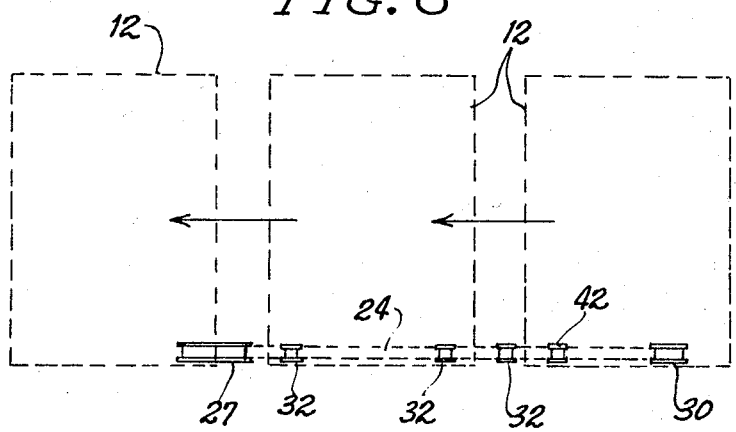

United States Patent Office 3,448,979
Patented June 10, 1969

3,448,979
FEEDING AND TRANSPORTING MECHANISM FOR X-RAY FILMS OR OTHER SHEETS
Robert B. Farmer, Glenview, Ill., assignor to Schick X-Ray Co., Inc., Chicago, Ill., a corporation of Illinois
Filed May 10, 1967, Ser. No. 637,441
Int. Cl. B65h 3/20
U.S. Cl. 271—33        12 Claims

ABSTRACT OF THE DISCLOSURE

A mechanism for feeding and transporting X-ray films or other sheets, comprising a supply mechanism for holding a pack of the sheets, an endless adhesive belt for transporting each sheet from the supply magazine to an exposure station and then into a receiving magazine, pulleys for supporting the belt, a drive motor connected to one of the pulleys for selectively advancing the belt, the supply magazine including a flange overlapping the leading edges of the sheets, a guide roller adjacent said flange for normally holding the belt away from the pack, a movable arm for deflecting the belt around the guide roller and into adhering relation with the adjacent sheet in the pack, a first solenoid for operating said arm, a second solenoid for moving one of the pulleys to tighten the belt and thereby separate the adhering sheet from the pack, the adhering sheet being moved out from under the flange in a direction opposite from the direction of advancing movement of the belt, a switch for starting the drive motor when the arm is moved away from the pack, a second switch for stopping the belt when the sheet arrives at the exposure station, and a third switch for preventing operation of the drive motor until the pressure plates at the exposure station are moved away from the sheet.

---

This invention relates to a new and improved mechanism for separating and transporting X-ray films or other sheets. The mechanism is particularly advantageous for use with sheets, like X-ray films, which are difficult to separate from a pack of such sheets.

Previous mechanism of various kind have been proposed for feeding and transporting X-ray films. However, difficulties have been encountered, because X-ray films are difficult to feed and transport in a reliable manner. Such films have smooth surfaces and thus are difficult to grip. Moreover, the films tend to stick together, because of cohesion between the smooth surfaces and also because of electrostatic attraction due to the electrical charges which tend to form on the sheets.

To cope with the problems of feeding and transporting X-ray films, the present invention employs an endless adhesive belt to separate the films from the pack, and to transport the films to the exposure station. The belt also transports the films from the exposure station to a receiving magazine or the like, whereupon the films are stripped from the belt.

A permanently tacky adhesive is provided on the outer side of the belt. A system of pulleys or the like is provided to circulate the belt and thereby transport the films or other sheets. A drive motor or the like is employed to operate at least one of the pulleys. When a film is to be picked up, relative movement is effected between the belt and the film pack, so that the belt is brought into adhering engagement with the adjacent film. Such film is then separated from the pack and transported by the advancing movement of the belt. Preferably, a pick-up device is provided to deflect the belt around a guide roller or the like and into engagement with the adjacent sheet. Such sheet is then separated from the pack, by moving one of the pulleys so as to tighten the belt. As the sheet is separated from the pack, the action of the tightening belt preferably brings about retrograde or backwards movement of the sheet so that it is withdrawn from a retaining flange which overlaps the sheets in the pack. The retaining flange assists in preventing the separation of more than one sheet.

Solenoids or other power means are preferably employed to operate the pick-up member and the movable pulley. The drive motor is preferably started by a switch which is operated by the movement of the pick-up member away from the pack. Another switch is preferably provided to stop the drive motor when the sheet arrives at the exposure station. Still another switch preferably prevents operation of the drive motor until the pressure plates at the exposure station have been moved apart to permit free movement of the sheet.

Further objects, advantages, and features of the present invention will appear from the following description taken with the accompanying drawings, in which:

FIG. 4 is a view similar to FIG. 3, but showing the mechanism in a subsequent stage of operation.

FIG. 5 is a fragmentary horizontal section showing the path of the films from the supply magazine to the exposure station and then to the receiving magazine.

FIG. 6 is a diagrammatic elevational view showing the manner in which the films are transported by the endless adhesive belt.

Figure 1:
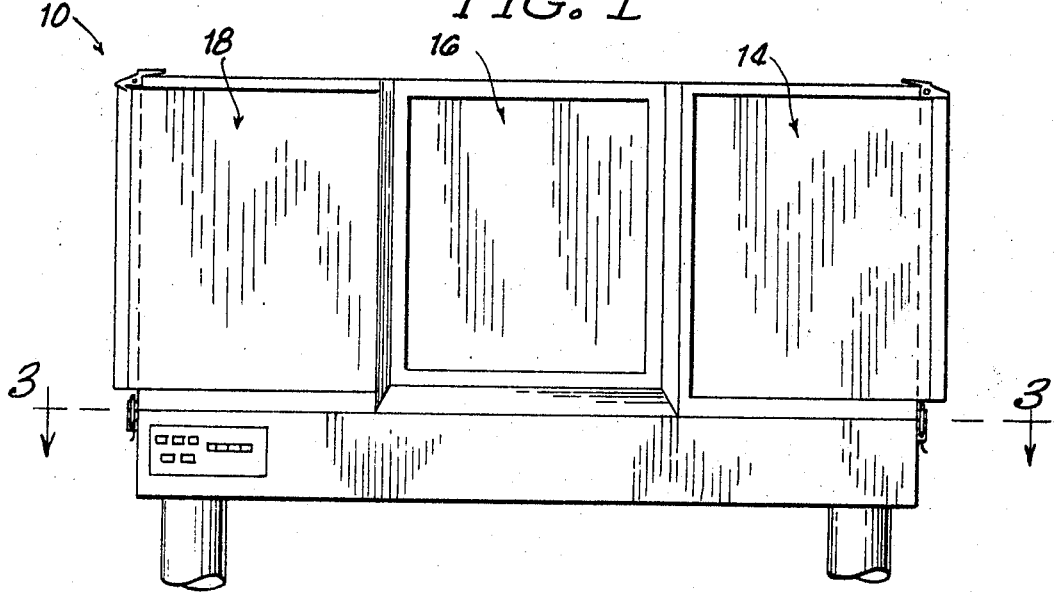
FIG. 1 is a general diagrammatic elevational view of an X-ray film transport mechanism to be described as an illustrative embodiment of the present invention.

As already indicated, the drawings illustrate a mechanism or machine 10 for transporting or handling X-ray films 12. A supply magazine or cassette 14 is provided to hold a pack of the films 12. It will be understood that other suitable means may be provided to hold the films. The films 12 are transported from the supply magazine 14 into a light-tight enclosure or casing 16 which provides the exposure station. After being exposed, the films are transported into a receiving magazine 18.

The magazines 14 and 18 are readily removable and replaceable. Thus, when all of the films in the supply magazine 14 have been used, the magazine may be replaced with another magazine having a full pack of films therein. When the receiving magazine 18 is full of exposed films, it may be replaced with an empty magazine.

At the exposure station 16, the films are adapted to move between front and rear intensifying screens 20 which are adapted to be pressed against the opposite sides of each film by front and rear pressure plates 22. Suitable power means are provided to move the pressure plates 22 toward and away from each other. Such means may take the form of spring return solenoids 26, represented diagrammatically in FIG. 7. When the pressure plates 22 are moved together, the film is clamped between the intensifying screens 20, which have fluorescent coatings, so that they emit visible light when struck by X-rays. Thus, the intensifying screens increase the effectiveness of the X-rays in producing latent images upon the X-ray films.

An endless adhesive belt 24 is preferably provided to separate each successive film 12 from the pack in the supply magazine 14. The belt then transports the film to the exposure station 16. After exposure, the belt transports the film into a receiving magazine 18.

A permanently tacky adhesive coating is provided on the endless belt 24 preferably on the outer side only of the belt. The belt itself may be made of a suitable plastic material with a pressure sensitive adhesive coating thereon. Such pressure sensitive adhesives will be well-known to those skilled in the art. The belt may be reinforced with glass fiber or the like, if desired.

Figure 2:
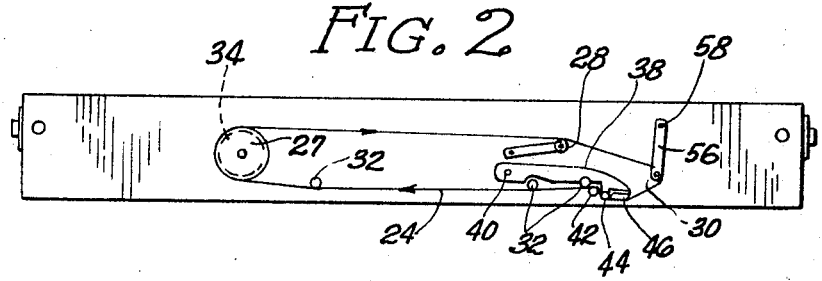
FIG. 2 is a diagrammatic plan view of the transport mechanism.

The endless belt 24 is adapted to be circulated around a system of pulleys or guides so that the belt can be advanced along the path which is to be followed by the films. As shown in FIG. 2, the belt 24 is trained around a drive pulley 26, two take-up pulleys 28 and 30, and a plurality of small guide pulleys or rollers 32. An electric motor 34 is preferably provided to turn the drive pulley 26 so that the belt 24 will be circulated. The motor 34 may incorporate reduction gears so as to advance the belt at the desired speed. A pick-up device 36 is provided to effect relative movement between the endless adhesive belt 24 and the film holding magazine 14 so that the belt will be brought into adhering contact with the adjacent film 12 in the pack. Preferably, the pick-up device 36 deflects the belt from its initial or normal path, so that the belt is pressed against the adjacent film. The belt and the adhering films are then moved away from the pack so that the film will be separated from the pack. By starting the drive motor 34, the belt 24 may then be advanced so that the film will be transported to the exposure station 16.

As illustrated, the pick-up device 36 comprises a movable member 38 which is in the form of an arm swingable about a vertical pivot 40. Initially, the belt 24 is held away from the film pack by a guide, preferably in the form of a roller 42. The arm 38 is adapted to deflect the belt 24 around the guide roller 42 and against the adjacent film.

To engage the belt 24, the illustrated arm 38 is fitted with a roller 44. A resiliently mounted shoe 46 is also is also preferably provided on the arm 38. Springs 48 are employed between the arm 38 and the shoe 46 to press the shoe against the belt 24 so that the belt will be pressed against the adajacent film in the film pack. The provision of the spring pressed shoe 46 insures that the belt will be pressed against the film over a considerable area, so that the belt will securely adhere to the film.

Power means are provided to operate the pick-up arm 38. In the illustrated mechanism, such power means take the form of a solenoid 50 which incorporates a return spring 52. The solenoid 50 is adapted to operate a lever 54 which is swingable with the arm 38. The solenoid 50 may operate the arm 38 in either direction. In the illustrated construction, the solenoid 50 is adapted to swing the pick-up arm 38 away from the adhesive belt 24 while the spring 52 is adapted to swing the arm 38 against the belt, so that the belt will be pressed against the adjacent film 12.

After the adhesive belt 24 has been pressed into adhering engagement with the adjacent film 12, the belt is employed to separate the film from the pack in the magazine 14. This is preferably accomplished by moving the pick-up arm 38 away from the belt and then tightening or straightening the belt. To provied for tightening the belt 24, the take-up pulley 30 is provided with a movable supporting member in the form of an arm 56, which is swingable about a pivot 58. Power means are preferably provided to move the arm 56 so as to tighten and loosen the belt 24. In the illustrated construction, such power means take the form of a solenoid 60 which incorporates a return spring 62. The solenoid 60 is adapted to operate a lever 64 which is swingable with the arm 56. While the solenoid may operate the arm 56 in either direction, the illustrated solenoid 60 is arranged to swing the arm 56 in such a direction as to loosen the belt 24. The spring 62 is adapted to tighten the belt when the solenoid 60 is deenergized. The loosening of the belt provides sufficient slack so that the belt can be pressed against the adjacent film 12 by the pick-up arm 38.

To assist in separating the successive films 12 from the pack, the magazine or holder 14 is provided with a flange or hook 66, which is adapted to overlap the leading edges of the films. A spring-pressed plate 68 is provided in the magazine 14 to press the film pack forwardly, so that the front film is normally pressed against the flange 66.

Figure 3:
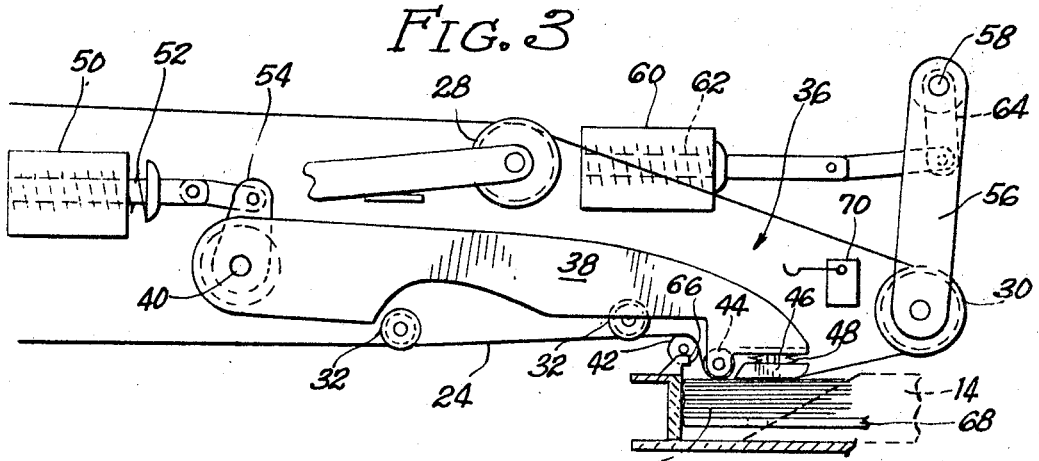
FIG. 3 is a fragmentary enlarged plan view showing the portion of the mechanism whereby the X-ray films are separated from the pack of films in the supply magazine, the view being partly in section along the line 3—3 in FIG. 1.

When the belt 24 is tightened or straightened by the movement of the pulley 30 and its supporting arm 56, the front film is pulled out from under the flange 66. Thus, the straightening of the belt produces backwards or retrograde movement of the front film, with respect to the direction of advancing movement of the belt 24. The backwards movement of the film 12 will be evident from a comparison of FIGS. 3 and 4. In FIG. 3, the pick-up arm 38 has pressed the belt 24 against the front film 12. It will be seen that the belt 24 is deflected into an S-curve around the rollers 42 and 44. In FIG. 4, the pick-up arm 38 has been moved away from the belt 24, and the belt has been tightened or straightened by the movement of the pulley supporting arm 56. The straightening of the belt 12 has removed the S-curve therefrom, with the result that the retrograde movement has been imparted to the front film 12 and the adhering portion of the belt 24. The flange or hook 66 is of assistance in preventing the separation of more than one film 12 from the pack. Thus, the remaining films continue to be retained behind the flange 66.

It will be seen from FIG. 4 that the front film 12 has been separated from the pack of films and is ready to be transported by the adhesive belt 24. The drive motor 34 may be energized to advance the belt 24. It is preferred to start the drive motor 34 in response to the outward movement of the pick-up arm 38. The simultaneous straightening of the belt causes separation of the front film 12 from the film pack. The illustrated mechanism is provided with a switch 70 which is adapted to be operated by the pick-up arm 38 as it is swung outwardly, away from the belt 24. The switch 70 is adapted to start the drive motor 34.

Figure 7:
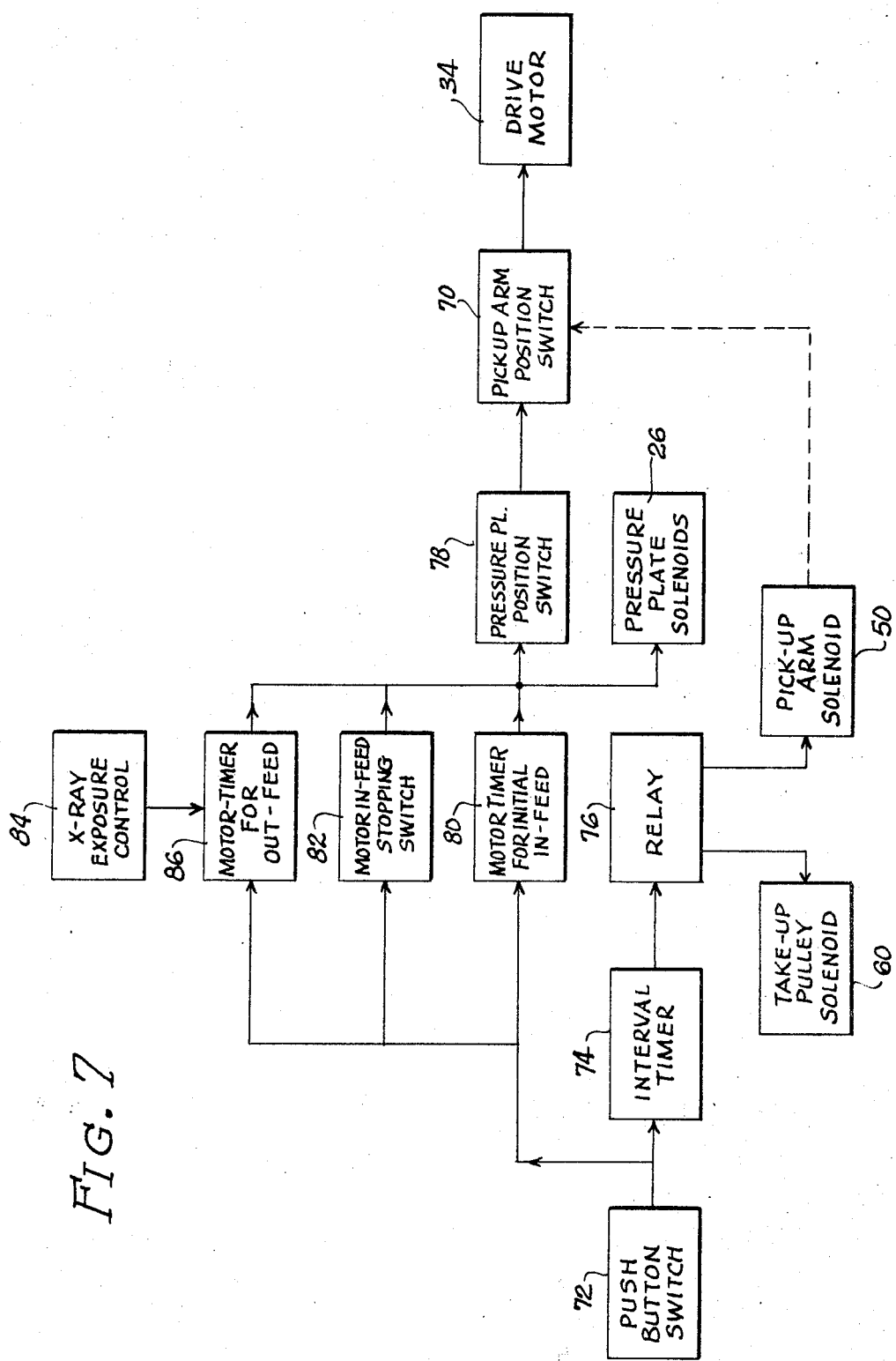
FIG. 7 is a block diagram of the electrical control circuit for the transport mechanism.

The control circuit of the transport mechanism 10 is illustrated schematically in the block diagram of FIG. 7 It will be convenient to describe the operation of the mechanism, along with the description of the block diagram. The operator initiates the operation of the transport mechanism 10 by pressing a push-button switch 72. This is done when it is desired to feed a film to the exposure station 16 in preparation for an X-ray exposure. The operation of the switch 72 starts a timing circuit 74 which controls a relay 76. The operation of the relay 76 causes energization of the solenoid 60 and de-energization of the solenoid 50. As a result, the belt 24 is loosened and is pressed against the front film by the pick-up arm 38. The timer 74 insures that the pick-up arm 38 is maintained against the belt 24 for a minimum interval to insure that the belt will be pressed securely into adhering engagement with the film. The timer then reverses the relay 76 so as to energize the relay 50 while de-energizing the relay 60. Consequently, the pickup arm 38 is swung away from the belt 24, while the belt is tightened by the movement of the supporting arm 56 and the pulley 30.

The outward movement of the pick-up arm 38 operates the switch 70 so as to start the drive motor 34. However, an additional switch 78 is provided to insure that the drive motor 34 will not be started until the pressure plates 22 have been moved apart, so that the film can be moved freely between the pressure plates. As shown in FIG. 5, the switch 78 is adapted to be operated by the outward movement of the front pressure plate 22.

Thus, the drive motor 34 is energized through both the pick-up arm position switch 70 and the pressure plate position switch 78. Further control over the drive motor 34 is exercised by a timing circuit 80 which is started by the operation of the starting switch 72. The timer 80 causes the motor 34 to be energized for a definite interval, sufficient to propel the film 12 into engagement with a control switch 82. It will be seen from FIG. 5 that the control switch 82 is positioned so that it is operated by the film as it reaches the exposure station 16.

The control switch 82 sustains the timer 80 and takes over the energization of the drive motor 34. Thus, the control switch 82 forms a parallel energizing path for the drive motor 34 around the timer 80, which tends to time-out shortly after the film has been moved into engagement with the switch 82.

When the film 12 has been moved fully into the exposure station 16, the trailing edge of the film drops off the switch 82 with the result that the drive motor 34 is stopped. Thus, the film 12 is stopped at the exposure station. Moreover, the pressure plate solenoid 26 is operated so as to cause the pressure plates 22 to move together. In this way, the intensifying screens are clamped against the opposite sides of the film.

Thus, the film is ready for the X-ray exposure. After the X-ray exposure, the drive motor 34 is again energized so that the film will be transported from the exposure station 16 into the receiving magazine 18. Preferably, the drive motor 34 is re-energized under the control of the X-ray exposure control device 84, which starts a timer 86 after the X-ray exposure has been made. The timer 86 forms a parallel energizing path for the drive motor 34, around the stopping switch 82. The timer 86 maintains energization of the drive motor 34 for a sufficient length of time to insure that the X-ray film will be moved completely from the exposure station 16 into the receiving magazine 18. Thus, the belt 24 is advanced by an amount somewhat greater than the length of the X-ray film. As the belt 24 travels around the drive pulley 26, the film is stripped from the adhesive belt by a stripping plate or deflector 88, which prevents the passage of the X-ray film around the pulley 26. The stripper 88 deflects the X-ray film into the receiving magazine 18.

After the drive motor 34 has been de-energized, by the timer 86, the mechanism is ready for another cycle, which may be initiated by operating the starting switch 72. If desired, the cycle may be modified to provide for the successive feeding of two or more X-ray films.

It will be evident that the illustrated mechanism is effective in separating the successive X-ray films from the film pack in a highly reliable manner. When the adhesive belt 24 is pressed against the front film by the pick-up arm 38, the belt adheres securely to the film. Thus, the belt 24 is capable of pulling the film away from the film pack in a reliable manner even though the films tend to stick together, due to cohesive action between the films, and also due to electrostatic attraction.

When the belt 24 is tightened by the movement of the pulley supporting arm 56, the front film is slid backwards, out from under the flange 66, and then is moved outwardly away from the film pack as shown in FIG. 4. The remaining films are retained by the flange 66, so that a separate film can be transported to the exposure station by the advancing movement of the belt.

Various other modifications, alternative constructions and equivalents may be employed.

I claim:

1. A mechanism for feeding and transporting X-ray films or other sheets,
    said mechanism comprising sheet holding means for holding a pack of the sheets,
    an endless belt having a permanently tacky adhesive on the outside thereof and distributed along substantially the entire length thereof,
    belt supporting means for removably holding said belt for movement past said pack,
    said belt supporting means comprising a drive pulley and at least one other pulley for removably supporting the endless belt,
    pick-up means for moving said belt against the adjacent sheet in the pack so that the adhesive on the belt will pick up the sheet,
    said pick-up means comprising a movable member for deflecting the belt toward the pack and against the adjacent sheet so that the sheet will adhere to the belt,
    said pick-up means including power means connected to said movable member,
    and operating means for moving the belt to separate the sheet from the pack,
    said operating means including power separating means for moving the belt away from the pack to separate the adjacent sheet therefrom,
    said operating means including motor means for turning said drive pulley to advance the belt and transport the sheet adhering thereto,
    said operating means comprising power means for causing movement of said other pulley to tighten and loosen the belt,
    said other pulley being movable in one direction to tighten the belt and thereby pull the belt away from the pack,
    said other pulley being movable in the opposite direction to loosen the belt to provide for deflection of the belt against the adjacent sheet in the pack.

2. A mechanism according to claim 1,
    in which said last mentioned power means comprise a solenoid for moving said other pulley in one direction,
    and resilient means for moving said other pulley in the opposite direction.

3. A mechanism for feeding and transporting X-ray films or other sheets,
    said mechanism comprising sheet holding means for holding a pack of the sheets,
    an endless belt having a permanently tacky adhesive on the outside thereof and distributed along substantially the entire length thereof,
    belt supporting means for removably holding said belt for movement past said pack,
    said belt supporting means comprising a plurality of pulleys for removably holding said belt,
    a guide adjacent the pack for normally holding the belt away from the pack,
    pick-up means for moving said belt against the adjacent sheet in the pack so that the adhesive on the belt will pick up the sheet,
    said pick-up means comprising a movable member adjacent said guide for deflecting the belt around said guide and against the adjacent sheet in the pack,
    first power means for operating said movable member,
    and operating means for moving the belt to separate the sheet from the pack,
    said operating means comprising second power means for moving one of said pulleys to tighten said belt thereby moving said belt away from the pack,
    whereby the sheet adhering to said belt will be separated from the pack.

4. A mechanism according to claim 3,
    in which said sheet supporting means comprise a flange overlapping the pack of sheets,
    the sheet adhering to said belt being moved from said flange as said sheet is separated from the pack.

5. A mechanism for feeding and transporting X-ray films or other sheets,
    said mechanism comprising sheet holding means for holding a pack of the sheets,
    an endless adhesive belt having a permanently tacky adhesive on the outside thereof and distributed along substantially the entire length thereof,
    a plurality of pulleys removably supporting said belt for circulating movement past the pack of sheets, selectively operable driving means for turning at least one of said pulleys to advance the belt,
a guide adjacent the pack for normally holding the belt away from the pack,
pick-up means for effecting relative movement between said belt and said sheet holding means to bring said belt into adhering engagement with the adjacent sheet in the pack,
whereby the sheet will be picked up and transported by said belt,
said pick-up means comprising a movable member for deflecting the belt around said guide and into adhering contact with the adjacent sheet in the pack,
first power means for operating said movable member,
and second power means for moving one of said pulleys to tighten the belt and thereby separate the belt and the adhering sheet from the pack.

6. A mechanism according to claim 5,
in which said sheet holding means comprise a flange overlapping the sheets in the pack,
the sheet being withdrawn from said flange as said sheet is separated from the pack.

7. A mechanism according to claim 5,
in which said guide comprises a roller engageable by said belt.

8. A mechanism for feeding and transporting X-ray films or other sheets,
said mechanism comprising sheet holding means for holding a pack of the sheets,
said sheet holding means comprising a flange overlapping the leading edges of th esheets in the pack,
an endless adhesive belt having a permanently tacky adhesive on the outside thereof and distributed along substantially the entire length thereof,
a plurality of pulleys removably supporting said belt for circulating movement past the pack of sheets,
selectively operable driving means for turning at least one of said pulleys to advance the belt,
a guide adjacent said flange for normally holding the belt away from the pack,
pick-up means for effecting relative movement between said belt and said sheet holding means to bring said belt into adhering engagement with the adjacent sheet in the pack,
whereby the sheet will be picked up and transported by said belt,
said pick-up means comprising a movable member for deflecting the belt around said guide and into adhering engagement with the adjacent sheet at a position in trailing relation to said guide and said flange,
first power means for operating said movable member,
and second power means for moving one of said pulleys so as to tighten the belt and thereby move the adhering sheet out from under said flange in a direction opposite to the direction of advancing movement of the belt,
the adhering sheet being transported by subsequent advancing movement of the belt.

9. A mechanism for feeding and transporting X-ray films or other sheets,
said mechanism comprising sheet holding means for holding a pack of the sheets,
an endless adhesive belt having a permanently tacky adhesive on the outside thereof and distributed along substantially the entire length thereof,
a plurality of pulleys removably supporting said belt for circulating movement past the pack of sheets,
selectively operable driving means for turning at least one of said pulleys to advance the belt,
pick-up means for effecting relative movement between said belt and said sheet holding means to bring said belt into adhering engagement with the adjacent sheet in the pack,
whereby the sheet will be picked up and transported by said belt,
a first control element operable by said pick-up means for starting said driving means to advance the belt and the sheet adhering thereto,
a pressure plate disposed along the path of movement of said sheet and movable into and out of engagement with the sheet,
and an additional control element operable by said pressure plate for preventing the starting of said driving means until said pressure plate is moved away from the sheet.

10. A mechanism for feeding and transporting X-ray films or other sheets,
said mechanism comprising sheet holding means for holding a pack of the sheets,
an endless adhesive belt having a permanently tacky adhesive on the outside thereof and distributed along substantially the entire length thereof,
a plurality of pulleys removably supporting said belt for circulating movement past the pack of sheets,
selectively operable driving means for turning at least one of said pulleys to advance the belt,
pick-up means for effecting relative movement between said belt and said sheet holding means to bring said belt into adhering engagement with the adjacent sheet in the pack,
whereby the sheet will be picked up and transported by said belt,
said pick-up means comprising a movable member movable toward and away from said belt for deflecting the belt into adhering contact with the adjacent sheet in the pack,
first power means for operating said movable member,
second power means for moving one of said pulleys to tighten the belt and thereby operate the belt and the adhering sheet from the pack,
and a control element operable by movement of said movable member away from the belt for starting said driving means.

11. A mechanism according to claim 10,
including a second control element operable by the advancing movement of the sheet for stopping said driving means.

12. A mechanism for feeding and transporting X-ray films or other sheets,
said mechanism comprising sheet holding means for holding a pack of the sheets,
an endless belt having a permanently tacky adhesive on the outside thereof,
said adhesive being distributed along substantially the entire length of said belt,
a plurality of pulleys removably supporting said belt for circulating movement past the pack of sheets,
selectively operable driving means for turning at least one of said pulleys to advance the belt,
and pick-up means for moving said belt against the adjacent sheet in the pack so that the adhesive on the belt will pick up and transport the sheet.

References Cited

UNITED STATES PATENTS 2,738,867  3/1956  Skillman _____ 198—32
3,223,059  12/1965  Jacobs _____ 271—33

FOREIGN PATENTS 15,752  10/1890  Great Britian.

RICHARD E. AEGERTER, *Primary Examiner.*